(12) United States Patent
Arend et al.

(10) Patent No.: US 7,343,557 B2
(45) Date of Patent: Mar. 11, 2008

(54) GUIDED DATA ENTRY USING INDICATOR AND INTERACTIVE STEP SYMBOLS

(75) Inventors: Udo Arend, Heidelberg (DE); Edmund Eberleh, St. Leon-Rot (DE); Heinz Willumeit, Leimen (DE)

(73) Assignee: SAP Aktiengesellschaft, Walldorf (DE)

( * ) Notice: Subject to any disclaimer, the term of this patent is extended or adjusted under 35 U.S.C. 154(b) by 812 days.

(21) Appl. No.: 10/426,934

(22) Filed: Apr. 30, 2003

(65) Prior Publication Data

US 2004/0221263 A1    Nov. 4, 2004

(51) Int. Cl.
G06F 3/00   (2006.01)
(52) U.S. Cl. ...................................... 715/709
(58) Field of Classification Search .................. 715/709
See application file for complete search history.

(56) References Cited

U.S. PATENT DOCUMENTS

| | | |
|---|---|---|
| 5,442,746 A | 8/1995 | Barrett |
| 5,632,022 A | 5/1997 | Warren et al. |
| 6,104,393 A | 8/2000 | Santos-Gomez |
| 6,269,355 B1 | 7/2001 | Grimse et al. |

FOREIGN PATENT DOCUMENTS

WO    91/06050    5/1991

OTHER PUBLICATIONS

Screen Dumps of Microsoft Excel (1999, pp. 1-24).*
Microsoft Corporation, "The Windows Interface Guidelines for Software Design," *Microsoft Press*, 1995, pp. 358-363.
Screen snapshot of the "My Money" product from Microsoft Corporation, printed from the Internet on Oct. 20, 2003.
Screen snapshot from www.amazon.com, printed from the Internet on Oct. 20, 2003
Manual "Getting Started with Quicken® 2004", printed from the Internet on Oct. 20, 2003.
Cooper, "About Face: The Essential of User Interface Design," *Hungry Minds, Inc.*, undated, pp. 503-504.
InstallShield, "The complete Windows Installation-Authoring Solution," *DevStudio*, printed from the Internet on Oct. 20, 2003, 4 pages.
http://www.goodwill.co.jp/oldmac/prototypes.html—"A Pictorial History of the " Apple Desktop Interface 1979-2000, printed from the Internet on Oct. 13, 2003, 4 pages.
http://www.novell.com/documentation/lg/extendas35/docs/help/books/ToolsPS.html—"The PeopleSoft Data Connector," printed from the Internet on Oct. 13, 2003, 8 pages.

* cited by examiner

*Primary Examiner*—Steven P. Sax
*Assistant Examiner*—Le Nguyen
(74) *Attorney, Agent, or Firm*—Fish & Richardson P.C.

(57) ABSTRACT

Techniques are disclosed for interacting with a user entering information for a computer application. In one general aspect, the invention provides for displaying a pane as a user interface for a user to enter information in a sequence of steps. The pane includes an information entry area, an interactive first step symbol capable of initiating a first step in the sequence, and a first indicator placed after the first step symbol. The first indicator indicates that a selection of a step to follow the first step depends on information received in the first step. A second step is selected to follow the first step using information received in the first step, and the first indicator is removed. An interactive second step symbol capable of initiating the second step is placed after the first step symbol.

26 Claims, 4 Drawing Sheets

GUIDED DATA ENTRY USING INDICATOR AND INTERACTIVE STEP SYMBOLS

TECHNICAL FIELD

The invention relates to computer user interfaces.

BACKGROUND

Computer users sometimes use wizards to assist them when performing a series of tasks. One example of such a wizard can be utilized during an installation of a software application. The wizard may appear as a pop-up window, and include queries and instructions designed to guide a user through the installation process in a defined sequence of steps. At each step, the user may be prompted to enter information, after which the user may select a button that causes the wizard to advance to the next step in the sequence. When the wizard reaches a final step of the sequence, the user may be asked to select a "finish" button, the process may conclude, and the wizard may disappear.

While wizards can be effective for simple tasks that have a defined sequence of steps, they may not be effective for complex step sequences where dynamic decision-making is needed. While using a wizard, the user may not realize how the process steps relate to one another because the wizard may not apprise the user of positional relationships between the sequence steps. Wizards may not be able to satisfactorily display alternative process steps to the user. Wizards also may not be able to satisfactorily display the existence of conditional process steps to the user. Some wizards are also restrictive by not allowing the user to select a process step directly.

SUMMARY OF THE INVENTION

The invention provides techniques for interacting with a user entering information for a computer system application. In one general aspect, the invention provides for the display of a pane as a user interface for the user to enter information in a sequence of steps. The pane includes an information entry area, an interactive first step symbol capable of initiating a first step in the sequence, and a first indicator placed after the first step symbol. The first indicator indicates that a selection of a step to follow the first step depends on information received in the first step. A second step is selected to follow the first step using information received in the first step. The first indicator is removed and an interactive second step symbol capable of initiating the second step is placed after the first step symbol.

In some embodiments, the information received in the first step may be processed. After processing the information, a status indicator may be provided for the first step symbol to indicate a level of completion of the first step. The status indicator may be selected from the group consisting of a completion indicator, a warning indicator, and a failure indicator. The sequence may include two or more steps, each associated with a step symbol. Information may be received and processed for each of the steps in turn, and each step symbol may be provided a status indicator after processing information received in that step. Each status indicator may indicate a level of completion for that step. The interactive first step symbol may be made interactive after successfully processing information received in a prior step of the sequence. A termination symbol associated with a final step of the sequence is displayed, and is highlighted following a completion of the sequence of steps.

The first indicator may represent a conditional step following the first step, and the conditional step may be conditioned on the information received in the first step. Selecting the second step may include deciding whether the conditional step should be initiated. It may be decided that the conditional step should not be initiated, in which case the second step symbol may be moved from a position after the first indicator to a position after the first step symbol. Alternatively, it may be decided that the conditional step should be initiated, in which case the second step symbol may be placed between the first step symbol and an interactive third step symbol.

An interactive third step symbol capable of initiating a third step in the sequence may be displayed after the second step symbol, and a second indicator may be displayed after the third step symbol. The second indicator indicates that a selection of a step to follow the third step depends on information received in the third step. The sequence may include at least two alternative steps following the first step, such that a choice between the alternative steps depends on the information received in the first step. The second step may be selected by choosing between the alternative steps.

Advantages of the invention may include one or more of the following. Improved user interface functionality for interacting with a user entering information in a sequence of steps. Improved flexibility in user interface applications by providing direct access to sequence steps. Convenient representation of complex step sequences that require dynamic decision-making. Convenient representation of positional relationships between the steps of the sequence, alternative process steps and conditional process steps.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
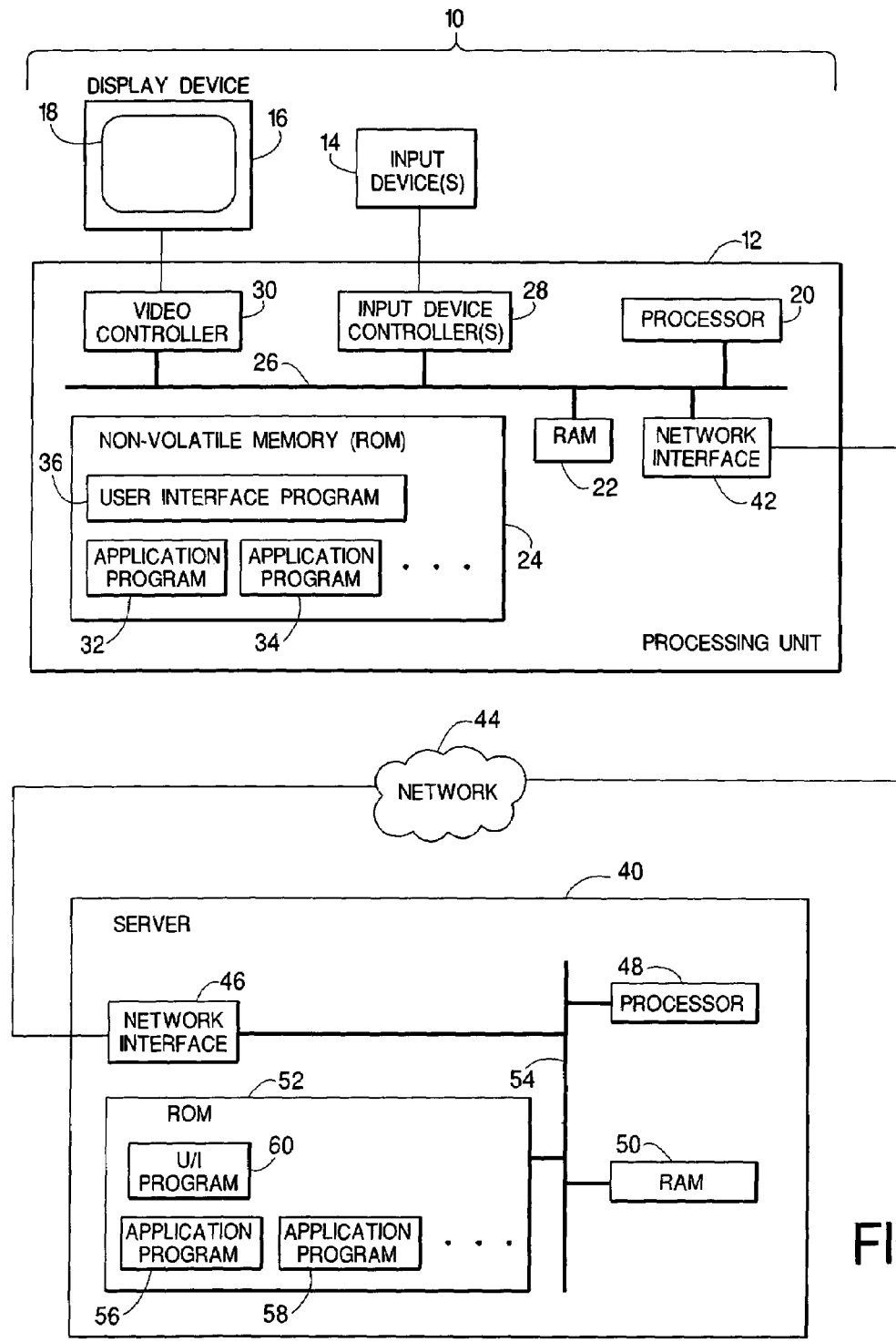
FIG. 1 is a block diagram of a system that may utilize aspects of the invention.

A computer system 10, shown in FIG. 1, includes a processing unit 12, one or more input devices 14, and a display device 16 upon which a user may be presented displays. The display device 16 has a screen 18 upon which displays may appear.

As is conventional, the processing unit 12 includes a processor 20, random access memory (RAM) 22, and read-only memory (ROM) 24, all interconnected by a data bus 26. Input device controllers 28, also connected to the data bus 26, receive command signals from input devices 14 and forward the command signals in the appropriate format for processing. A video controller 30, connected to the data bus 26, receives video command signals from the data bus 26 and generates the appropriate video signals that are forwarded to the display device 16 so that the desired display is provided on the screen 18. The computer system 10 is not limited to a personal computer, but could instead include a personal digital assistant, a terminal, a workstation, or other such device.

ROM 24, as is conventional, may provide non-volatile data storage for various application programs 32, 34, etc. As is conventional, programs 32 and 34 have program instructions that may be loaded into RAM 22 during operation. Processor 20 may then execute the program instructions, as required, to perform particular program functions. Also stored in ROM 24 is a user interface program 36 that may be designed to work in concert with each of the application programs 32, 34, etc. This is conceptually depicted in FIG. 1 by the user interface program 36 being shown as a layer on top of the application programs 32, 34, etc.

With such a design, user interface program modules common to several application programs need not be duplicated in each of the application programs. In addition, such a design may enable a common "look-and-feel" to the user interface for the different program applications 32, 34, etc. The user interface program 36 may create a display in accordance with the invention to be presented to a user on screen 18 of display device 16. The user may interact with the display by providing input using an input device 14, such as a mouse, keyboard, light pen, touchpad, joystick, etc. The user interface program 36 may use the received input to take appropriate actions, such as creating a new display, interacting with applications programs 32 and/or 34, accessing a database (not shown), or accessing server 40 (described below), to list just a few examples. In other implementations, the user interface program, or module, need not be a common program or module for more than one program application. Also, the components just described could be combined or separated in various manners, and could be stored in various manners, such as on various non-volatile storage medium.

Also shown in FIG. 1 is server 40. The computer system 10 may access server 40 to run applications residing on the server 40. The computer system 10 may do so by using a network interface 42 connected to its data bus 26 to access a network 44. Network 44 may be, for example, a local area network (LAN), wide area network (WAN), or the Internet. As is conventional, the server 40 includes a network interface 46, a processor 48, RAM 50, and ROM 52, all interconnected by a data bus 54. The server's network interface 46 provides the connection to network 44 so that client computer systems, such as system 10, can access the server 40. In similar fashion to computer system 10, the server ROM 52 includes various different application programs 56, 58, etc., as well as a common user interface program 60 for the application programs 56, 58, etc. User interface program 60 may operate similarly to user interface program 36. Any of the entities described above in server ROM 52 could alternatively be located in a separate server, database, or computer system.

The following description is set in the exemplary context of a program application for human capital management (HCM). An HCM program application can manage a company's interactions with its employees, for example hiring new employees, payroll processing, organizational hierarchies, etc. In one implementation, the HCM application program is made up of several different application program modules, some of which reside on a client computer, such as system 10, while others reside on a central server, such as server 40. HCM functions typically generate and require access to a large amount of data that is stored in various databases on a client or server. The data can include personal employee information, job-related employee information, organizational information, and financial or strategic planning information, to list just a few examples. In other implementations, the application program could reside entirely on the client computer system 10 or entirely on server 40.

Figure 2:
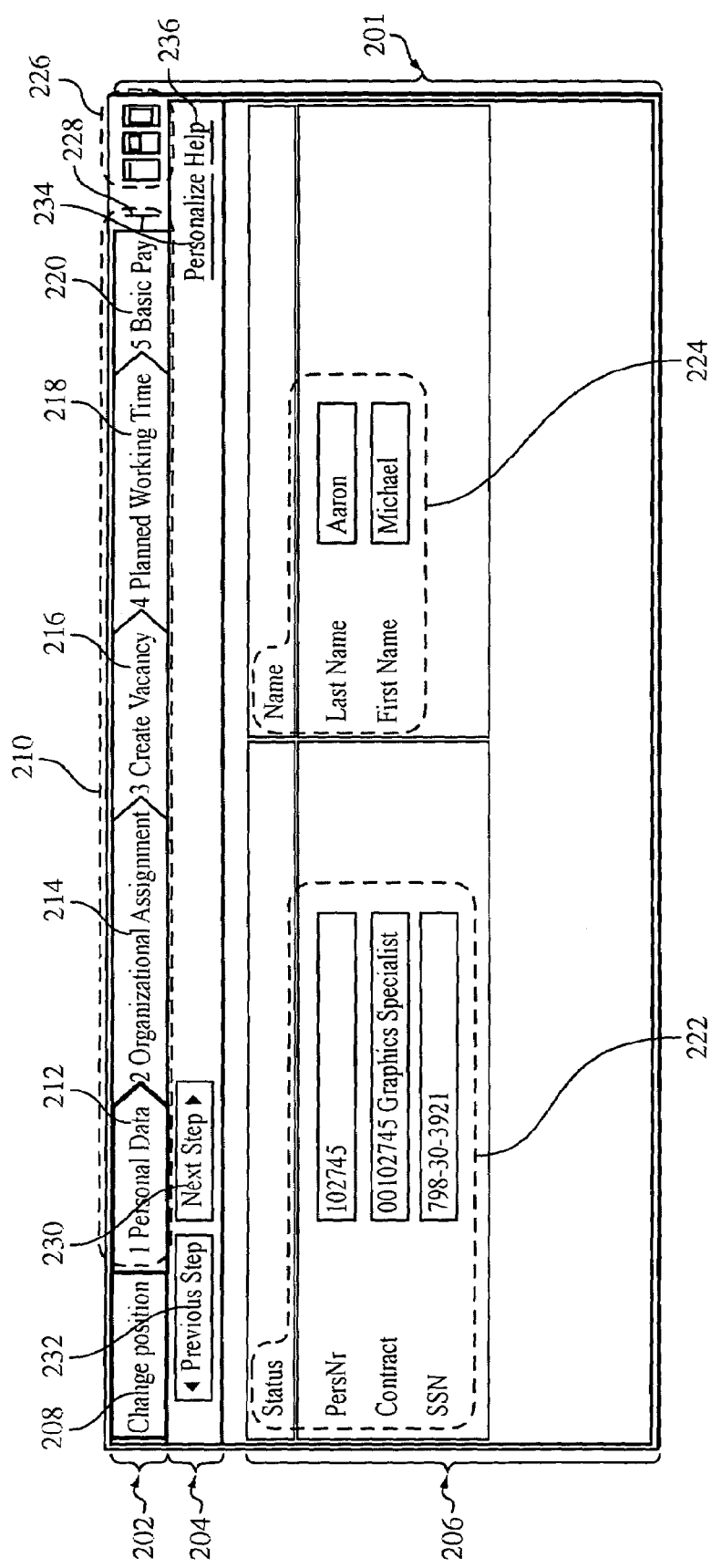
FIG. 2 is a screen snapshot of a computer display embodying the invention.

FIG. 2 shows an exemplary pane 201 that may be presented on screen 18 to a user of an HCM application program. In this example, a user is using the program to view and enter personal data and organizational assignment information for a newly hired employee. The user, who may work in the company's human resources department, may be entering the information prior to the new employee's start date to update the company's records of organizational units (such as sales teams and associated sales district responsibilities, for example).

The pane 201 includes a step bar 202, a toolbar 204, and an information entry area 206. The user may enter information in a sequence of steps, aided by step bar 202, which may provide the user guidance and visual feedback during the information entry process. Step bar 202 includes a title 208 near a left edge of the step bar 202 to inform the user of the purpose of the pane 201. In this example, the title 208 is "Change Position," indicating that pane 201 may be used to add or update employee information categorized by the position or job responsibility of the employee. In other implementations, the title 208 may be omitted.

A group 210 of step symbols, to the right of the title 208, identifies a sequence of steps in the information entry process. If a step symbol is interactive, the user may initiate the corresponding step by selecting that interactive step symbol. Step symbols 212, 214, 216, 218 and 220 are interactive and the user may select a step symbol (e.g., using an input device 14, such as a mouse) to initiate the associated step. The information entry area 206 may be updated corresponding to the selected step in the sequence, and appropriate messages may be displayed. For example, different steps may have different input fields. Moreover, individual steps may have dependencies that provide for certain steps to be executed in a defined order, as will be described below.

A "Personal Data" step symbol 212 is associated with a step is of the sequence where personal data is entered. In FIG. 2, the "Personal Data" step symbol 212 is highlighted to indicate that the personal-data step has been initiated and that information currently displayed in pane 201 relates to the personal-data step.

The information entry area 206 allows the user to enter and edit data. The information entry area 206 may be updated as a new step in the sequence is initiated to provide the appropriate input fields for the step associated with the currently selected step symbol. Information entry area 206 includes a "Status" group 222 of input fields and a "Name" group 224 of input fields to facilitate the entry of such information.

Information entry area 206 need not contain input fields. It can contain instructions, warnings, status messages, and/or an area for entering notes. Conventional user interface input means such as drop-down selection boxes, checkboxes and the like are also possible. A group of three icons 226, located in an upper right corner of pane 201, permit the user to select a size for pane 201, e.g., small, medium, or large.

"Organizational Assignment" step symbol 214, to the right of the "Personal Data" step symbol 212, is associated with a step of the sequence where organizational assignment data is entered. Following the step symbol 214 are step symbols for steps where other information may be entered:

216 (Create Vacancy), 218 (Planned Working Time), and 220 (Basic Pay). The step bar 202 concludes with a termination symbol 228 that represents a final step in the sequence. The termination symbol 228 is highlighted when the sequence of steps has been completely executed.

The toolbar 204 provides functionality for the pane 201. A "Next Step" button 230, when selected, may cause the application program to advance to the next step in the sequence. This may involve processing information received in the currently selected step. Selecting the "Next Step" button 230 may also cause the application program to display a status indicator (which is not shown in FIG. 2 but will be discussed later) with the currently selected step.

In an embodiment where the sequence comprises a plurality of steps, wherein each step is associated with a step symbol, the information for each of the steps may be received and processed in turn. Each step symbol may be provided with a status indicator after the processing of information received in that step.

Similarly, a "Previous Step" button 232 may, when selected, cause the application program to revert to a step prior to the current step in the sequence. In this manner, a user may proceed through the sequence of steps using the step bar 202, the toolbar 204, and the information entry area 206. A "Personalize" icon 234 and a "Help" icon 236 permit the user to select customized preferences for pane 201 and receive help, respectively. Toolbar 204 may be updated as a new step is initiated in step bar 202. Thus, the toolbar 204 may, for example, contain additional functionality means, including custom functionality such as action buttons particular to a selected sequence step.

FIGS. 3-6 and the accompanying description will focus on step bars. The step bars may be part of panes displayed on screen 18, similar to the pane 201 shown in FIG. 2 and described above. Such panes may also include toolbars and information entry areas. For simplicity, however, only the step bars are shown in FIGS. 3-6.

Figure 3:
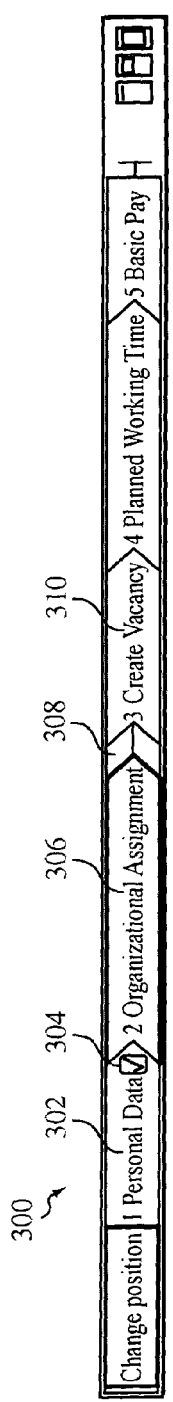
FIGS. 3-6 are selected portions of computer displays embodying the invention.

FIG. 3 shows a step bar 300 that includes step symbols that are similar to those shown in FIG. 2, as will be described below. Step bar 300 includes a "Personal Data" step symbol 302 with an associated status indicator 304, and a highlighted "Organizational Assignment" step symbol 306. Status indicator 304 includes a checkmark displayed within the "Personal Data" step symbol 302 as a completion indicator to the user that the personal-data step of the sequence has been successfully completed. In other implementations, the status indicator 304 could appear at another location within the step bar or elsewhere on the display, or it could be omitted. Status indicator 304 may include other types of status indicators such as a warning indicator or failure indicator, and may be colored.

The "Organizational Assignment" step symbol 306 is highlighted in FIG. 3 to indicate that an organizational-assignment step has been initiated. A pane where step bar 300 is located (in analogy with pane 201) may include an updated information entry area having input fields for receiving organizational assignment information in the organizational-assignment step, and a toolbar.

The sequence may include conditional steps, that is, steps that will be initiated only upon a particular condition or conditions. In the step bar 300, conditional-step indicator 308 is located between the "Organizational Assignment" step symbol 306 and a "Create Vacancy" step symbol 310. The conditional-step indicator 308 represents one or more conditional steps that may be included between the organizational-assignment step and the create-vacancy step of the sequence, depending on information received in the organizational-assignment step. Thus, the program may select an appropriate step to follow the organizational-assignment step. If, based on the received information, one or more of the conditional steps are to be used in the sequence of steps, the step bar can include one or more additional step symbols after the "Organizational Assignment" step symbol 306 that represent the one or more conditional steps. Conversely, if, based on the received information, the conditional steps are not to be used in the sequence, the "Create Vacancy" step symbol 310 can be placed directly after the "Organizational Assignment" step symbol 306.

For example, the organizational-assignment step might involve an organizational assignment of the new employee. As such, the user might be prompted to enter information in appropriate input fields of a corresponding information entry area to indicate the country in which the new employee will be based. In this example, entering the name of a particular country may trigger one or more conditional steps represented by the conditional-step indicator 308. Here, the user has entered information in the organizational-assignment step specifying that the new employee is to be based in India.

Figure 4:
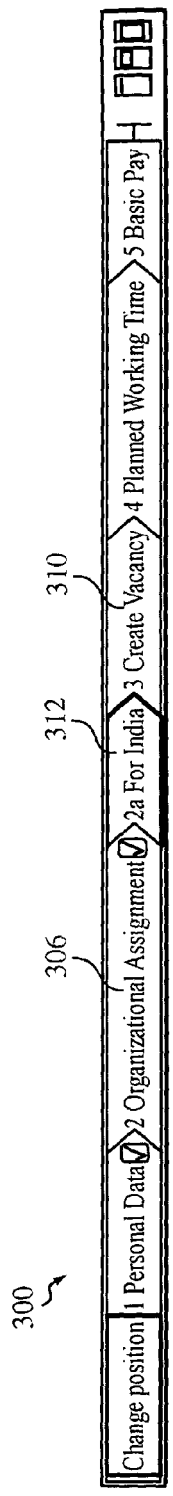

FIG. 4 shows the step bar 300 where the conditional-step indicator 308 from FIG. 3 has been replaced by a "For India" conditional-step symbol 312 representing a conditional step that was initiated as a result of receiving information in the organizational-assignment step. The "Create Vacancy" step symbol 310 now appears after the conditional-step symbol 312 to indicate that the create-vacancy step follows the conditional step in the sequence.

In this example, a single conditional step (represented by conditional-step symbol 312) was initiated. In other situations, two or more conditional-step symbols may be added, representing respective conditional steps. More than one conditional-step indicator may occur in step bar 300, and incremental conditional-step indicators may be used. For example, another conditional-step indicator (not shown) may be displayed in step bar 300 after conditional-step symbol 312 (which represents a "For India" conditional step) and before the "Create Vacancy" step symbol 310, to indicate that one or more conditional steps are possible, depending on input received in the "For India" conditional step.

Figure 5:
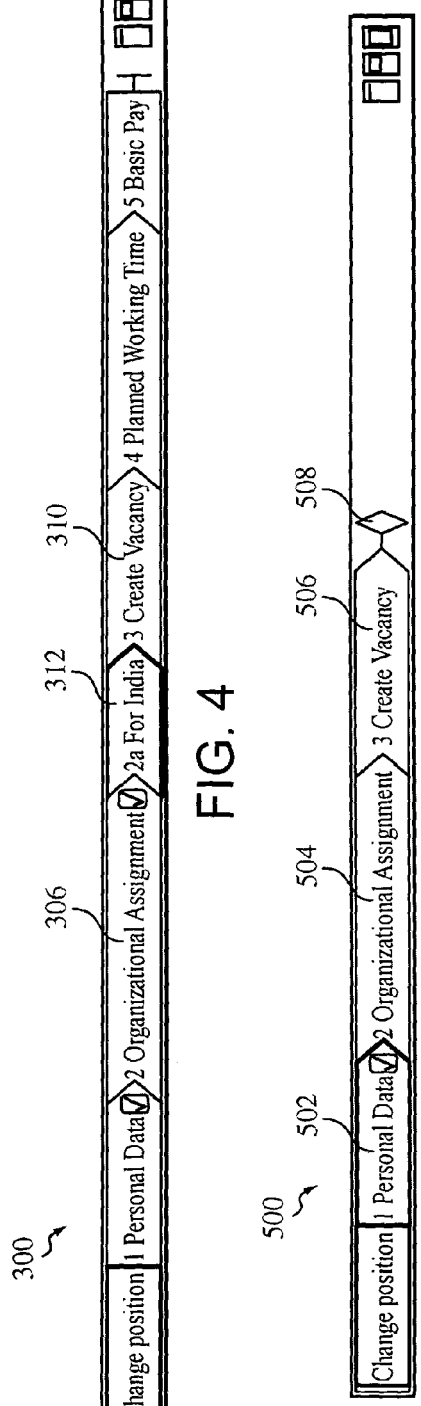

The sequence may contain alternative steps, as will now be described with reference to FIG. 5. A step bar 500 represents a sequence of steps where a choice between two or more alternative steps is to be made. A "Personal Data" step symbol 502 is highlighted and has a completion status indicator that indicates that the personal-data step has previously been completed. An "Organizational Assignment" step symbol 504 and a "Create Vacancy" step symbol 506 follow after the "Personal Data" step symbol 502, and respectively represent organizational-assignment and create-vacancy steps of the sequence.

The "Create Vacancy" step symbol 506 is lighter in color than the other step symbols described so far, which may indicate that it is not interactive. A step symbol may be non-interactive (that is, not selectable by the user) if it depends on information that must first be received in a previous sequence step. In the FIG. 5 example, the user may have to first complete the organizational-assignment step (e.g., by selecting the "Organizational Assignment" step symbol 504 and entering information in associated information entry area input fields), after which the "Create Vacancy" step symbol 506 may become interactive (that is, selectable by the user).

A branch indicator 508 following the "Create Vacancy" step symbol 506 represents two or more alternative steps after the create-vacancy step. A choice is to be made between the alternative steps depending on information received in a previous step of the sequence, such as the organizational-assignment step or the create-vacancy step. Thus, the step bar 500 visually represents a dynamic sequence of steps and informs the user that information provided may resolve a choice between alternative sequence steps. Step bar 500 does not include a termination symbol because the sequence does not have a currently defined final step, pending resolution of branch indicator 508.

The choice between alternative steps to follow the create-vacancy step may depend on information received in the create-vacancy step. Three exemplary alternative steps will be mentioned here. As a first example, the new employee may be hired to manage a team of workers, in which case it may be desirable to initiate a step of entering the names of those current employees who will report to the new manager. As a second example, the new employee might be hired in a non-managerial position where flexible working hours are possible, and it may be desirable to initiate a step of entering a schedule of normal working hours for the new employee. As a third example, the new employee may be slated to work a certain shift each day, and it may be desirable to initiate a step of entering information to specify the production team on which the new employee will be staffed. After the necessary information has been entered, it will be decided which of the alternative steps should be initiated.

Figure 6:
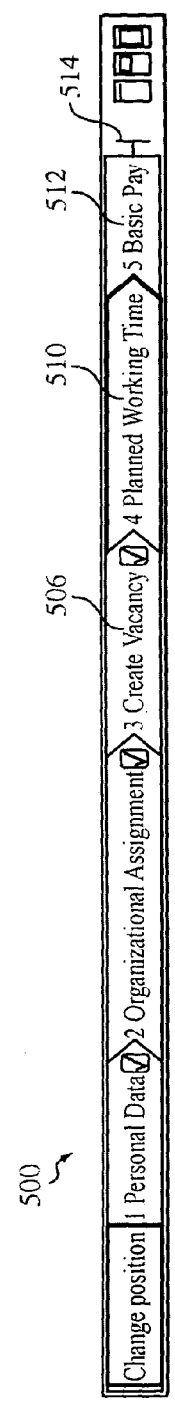

With reference to FIG. 6, it will now be described how step bar 500 may be updated when the sequence proceeds with the alternative step in the second example just mentioned. The branch indicator 508 that appeared in FIG. 5 has now been removed. A "Planned Working Time" step symbol 510 appears after the "Create Vacancy" step symbol 506. A "Basic Pay" step symbol 512 follows the "Planned Working Time" step symbol 510 and represents a step of entering salary information. The step symbols 510 and 512 both represent alternative steps in that they may not have been initiated but for the entry of certain information in a previous step. A termination symbol 514 represents a final step of the sequence. In another embodiment, information from the organizational-assignment step in FIG. 5 may be used to resolve the choice between alternative steps represented by branch indicator 508.

Incremental branch indicators may be used. For example, in FIG. 6, the branch indicator 508 could appear in lieu of the "Basic Pay" step symbol 512 and termination symbol 514. It may then represent two or more alternative steps to follow the planned-working-time step.

Figure 7:
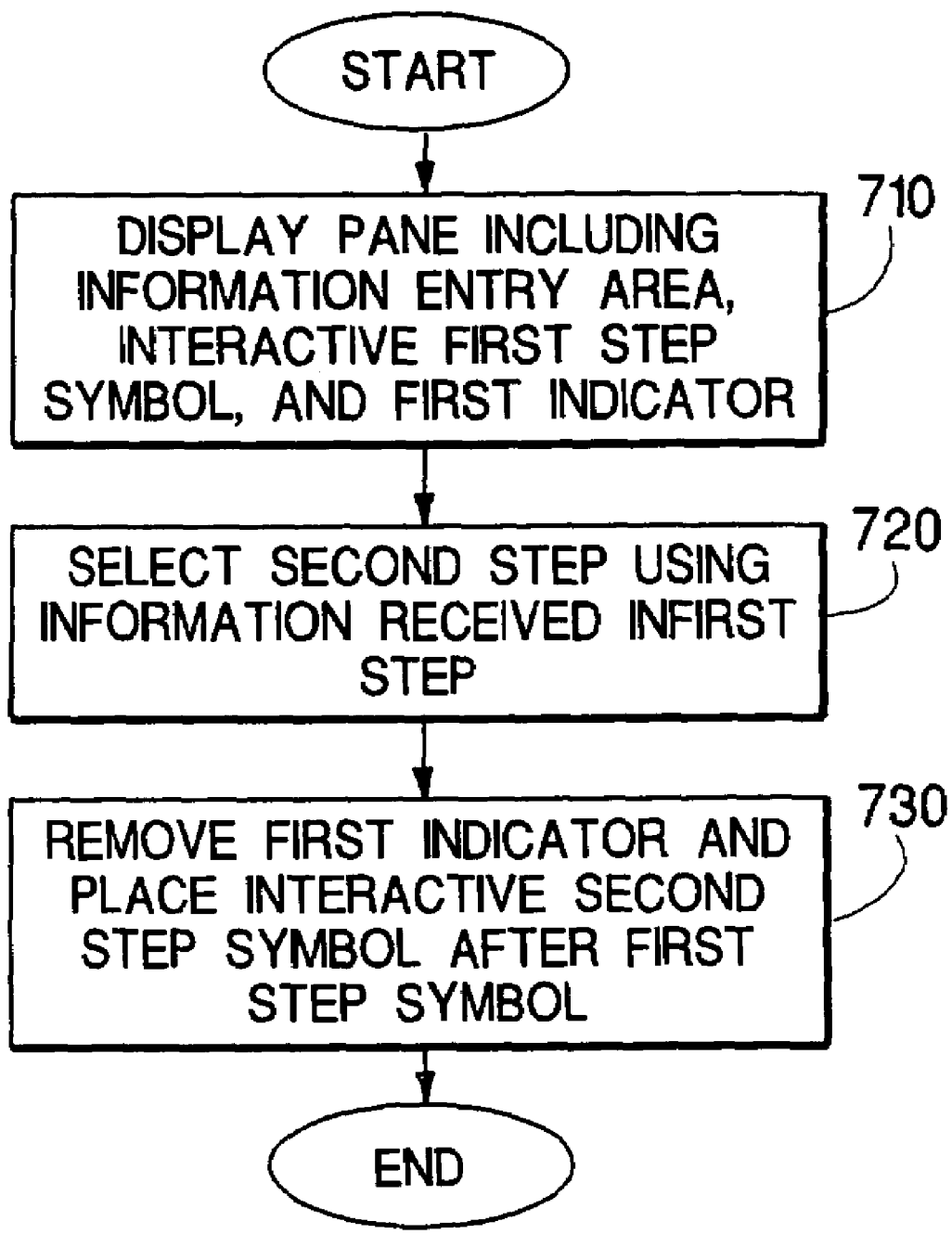
FIG. 7 is an exemplary flowchart illustrating an operation of a user interface software application that embodies the invention.

The flowchart of FIG. 7 shows an example of a process that the user interface program 36 may perform. The process performed by the processor 20 begins, at step 710, with displaying a pane that includes an information entry area (such as information entry area 206), an interactive first step symbol (such as step symbol 306), and a first indicator (such as conditional-step indicator 308 or branch indicator 508) on screen 18. The process continues, at step 720, with selecting a second step using information received in the first step. This may involve deciding to initiate a conditional step such as one represented by the conditional-step indicator 308. As another example, it may involve deciding which step to initiate among alternative steps, such as deciding to initiate a step represented by the branch indicator 508.

Next, the first indicator is removed and an interactive second step symbol is placed after the first step symbol at step 730. This may involve placing the step symbol 312 after step symbol 306 (FIG. 4). As another example, it may involve moving step symbol 310 to immediately behind step symbol 306. As yet another example, it may involve placing step symbol 510 immediately after step symbol 506 (FIG. 6).

The particular embodiments discussed and depicted above are merely illustrative, and may be modified and reconfigured readily in accordance with the teachings set forth herein. By way of non-limiting example, the step bars need not be arranged horizontally, but could instead be arranged vertically, diagonally, etc. The conditional-step indicators and the branch indicators discussed and depicted herein may be provided in alternative shapes and sizes, as may the step symbols. A step bar may simultaneously provide a conditional-step indicator and a branch indicator. Step symbols may include markings, labels, and the like to indicate that a corresponding step is required, whereas other steps may be optional. When the program processes the entered information and detects an error, an error message may be written to a log file.

A number of embodiments of the invention have been described. Nevertheless, it will be understood that various modifications may be made without departing from the spirit and scope of the invention. Accordingly, other embodiments are within the scope of the following claims.

What is claimed is:

1. A method of interacting with a user entering information, the method comprising:
   displaying a pane as a user interface for a user to enter information in a sequence of steps, the pane comprising an information entry area, an interactive first step symbol capable of initiating a first step in the sequence, and a first indicator placed after the first step symbol, the first indicator indicating that a selection of a step among multiple second steps to follow the first step depends on information received in the first step;
   selecting a second step from the multiple second steps to follow the first step using information received in the first step; and
   removing the first indicator and placing an interactive second step symbol after the first step symbol, the second step symbol being capable of initiating the second step.

2. The method of claim 1 further comprising processing the information received in the first step.

3. The method of claim 2 further comprising providing the first step symbol with a status indicator after processing the information, the status indicator indicating a level of completion of the first step.

4. The method of claim 3 wherein the status indicator is selected from the group consisting of a completion indicator, a warning indicator, and a failure indicator.

5. The method of claim 1 wherein the sequence comprises a plurality of steps and wherein each step is associated with a step symbol, further comprising receiving and processing information for each of the steps in turn, and providing each step symbol with a status indicator after processing information received in that step, each status indicator indicating a level of completion for that step.

6. The method of claim 1 wherein the interactive first step symbol was made interactive after successfully processing information received in a prior step of the sequence, the prior step preceding the first step in the sequence.

7. The method of claim 1 further comprising displaying a termination symbol associated with a final step of the sequence, the termination symbol being highlighted following a completion of the sequence of steps.

8. The method of claim 1, wherein the first indicator represents a conditional step following the first step, the conditional step being conditioned on the information received in the first step, and wherein selecting the second step comprises deciding whether the conditional step should be initiated.

9. The method of claim 8 wherein it is decided that the conditional step should not be initiated, and wherein placing the interactive second step symbol after the first step symbol comprises moving the second step symbol from a position after the first indicator to a position after the first step symbol.

10. The method of claim 8 wherein it is decided that the conditional step should be initiated, and wherein placing the interactive second step symbol after the first step symbol comprises placing the second step symbol between the first step symbol and an interactive third step symbol.

11. The method of claim 8 further comprising displaying an interactive third step symbol after the second step symbol, the interactive third step symbol being capable of initiating a third step in the sequence, and displaying a second indicator after the third step symbol, the second indicator indicating that a selection of a step among multiple steps to follow the third step depends on information received in the third step.

12. The method of claim 1, wherein the multiple second steps include at least two alternative steps following the first step, wherein a choice between the alternative steps depends on the information received in the first step, and wherein selecting the second step comprises choosing between the alternative steps.

13. The method of claim 12 further comprising displaying an interactive third step symbol after the second step symbol, the interactive third step symbol being capable of initiating a third step in the sequence, and displaying a second indicator after the third step symbol, the second indicator indicating that a selection of a step among multiple steps to follow the third step depends on information received in the third step.

14. Computer-readable medium with program instructions stored thereon that when executed perform the following functions for interacting with a user entering information:
   displays a pane as a user interface for a user to enter information in a sequence of steps, the pane comprising an information entry area, an interactive first step symbol capable of initiating a first step in the sequence, and a first indicator placed after the first step symbol, the first indicator indicating that a selection of a step among multiple second steps to follow the first step depends on information received in the first step;
   selecting a second step from the multiple second steps to follow the first step using information received in the first step; and
   removes the first indicator and places an interactive second step symbol after the first step symbol, the second step symbol being capable of initiating the second step.

15. The medium of claim 14 further comprising instructions that when executed process the information received in the first step.

16. The medium of claim 15 further comprising instructions that when executed provide the first step symbol with a status indicator after processing the information, the status indicator indicating a level of completion of the first step.

17. The medium of claim 16 wherein the status indicator is selected from the group consisting of a completion indicator, a warning indicator, and a failure indicator.

18. The medium of claim 14 wherein the sequence comprises a plurality of steps and wherein each step is associated with a step symbol, further comprising instructions that when executed receive and process information for each of the steps in turn, and provide each step symbol with a status indicator after processing information received in that step, each status indicator indicating a level of completion for that step.

19. The medium of claim 14 wherein the interactive first step symbol was made interactive after successfully processing information received in a prior step of the sequence, the prior step preceding the first step in the sequence.

20. The medium of claim 14 further comprising instructions that when executed displays a termination symbol associated with a final step of the sequence, the termination symbol being highlighted following a completion of the sequence of steps.

21. The medium of claim 14, wherein the first indicator represents a conditional step following the first step, the conditional step being conditioned on the information received in the first step, and wherein selecting the second step comprises deciding whether the conditional step should be initiated.

22. The medium of claim 21 wherein it is decided that the conditional step should not be initiated, and wherein placing the interactive second step symbol after the first step symbol comprises moving the second step symbol from a position after the first indicator to a position after the first step symbol.

23. The medium of claim 21 wherein it is decided that the conditional step should be initiated, and wherein placing the interactive second step symbol after the first step symbol comprises placing the second step symbol between the first step symbol and an interactive third step symbol.

24. The medium of claim 21 further comprising instructions that when executed displays an interactive third step symbol after the second step symbol, the interactive third step symbol being capable of initiating a third step in the sequence, and displays a second indicator after the third step symbol, the second indicator indicating that a selection of a step among multiple steps to follow the third step depends on information received in the third step.

25. The medium of claim 14, wherein the multiple second steps include at least two alternative steps following the first step, wherein a choice between the alternative steps depends on the information received in the first step, and wherein selecting the second step comprises choosing between the alternative steps.

26. The medium of claim 25 further comprising instructions that when executed displays an interactive third step symbol after the second step symbol, the interactive third step symbol being capable of initiating a third step in the sequence, and displays a second indicator after the third step symbol, the second indicator indicating that a selection of a step among multiple steps to follow the third step depends on information received in the third step.

* * * * *